United States Patent [19]

Walter et al.

[11] 3,976,534

[45] Aug. 24, 1976

[54] DEVICE FOR USE IN UNITING THE ADJACENT ENDS OF RADIALLY SPLIT SEALING RINGS

[75] Inventors: Gerhard H. W. Walter; Gunter E. W. Pietsch, both of Hamburg, Germany

[73] Assignee: Howaldtswerke-Deutsche Werft Aktiengesellschaft Hamburg und Kiel, Hamburg, Germany

[22] Filed: July 22, 1974

[21] Appl. No.: 490,748

[30] Foreign Application Priority Data

July 28, 1973  Germany............................ 2338373

[52] U.S. Cl.................................. 156/507; 156/579; 156/583
[51] Int. Cl.² .................... B29H 15/04; B30B 15/34
[58] Field of Search ........... 156/583, 503, 502, 507, 156/304, 157, 158, 122, , 579, 391; 285/21

[56] References Cited
UNITED STATES PATENTS

| 1,802,491 | 4/1931 | Young et al. ........................ 156/503 |
| 2,389,560 | 11/1945 | Steffens ............................... 156/507 |
| 2,647,555 | 8/1953 | Hinman ............................... 156/122 |
| 2,679,888 | 6/1954 | Bohon................................ 156/507 |
| 3,727,289 | 4/1973 | Bemelmann et al. ........... 156/503 X |

Primary Examiner—Douglas J. Drummond
Assistant Examiner—M. G. Wityshyn
Attorney, Agent, or Firm—Stevens, Davis, Miller & Mosher

[57] ABSTRACT

An apparatus for homogeneously joining together the cut surfaces of a sealing ring of elastic material, which has been cut open radially on one side, particularly for stern tube seals in ships, utilizing a body member and segment provided with apertures corresponding to the contours of the sealing ring and utilizing clamping means for fastening the ends of the sealing ring, the cut surfaces of which have been provided with an adhesive, the body member receiving the ends of the divided sealing ring being made in the form of a shaped body divided in the radial direction of the sealing ring, with its parts being relatively movable towards and away from one another in a substantially tangential direction.

11 Claims, 4 Drawing Figures

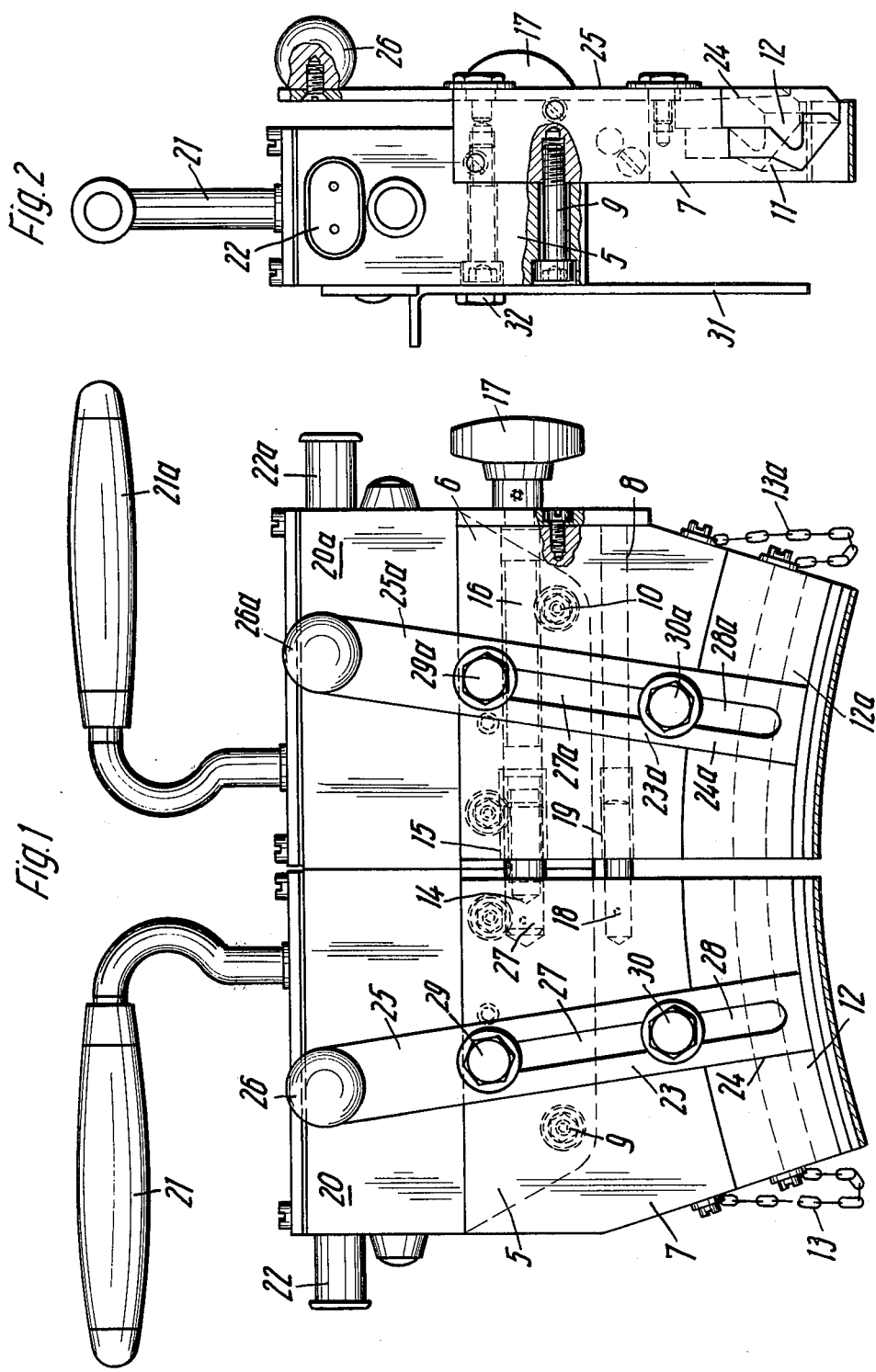

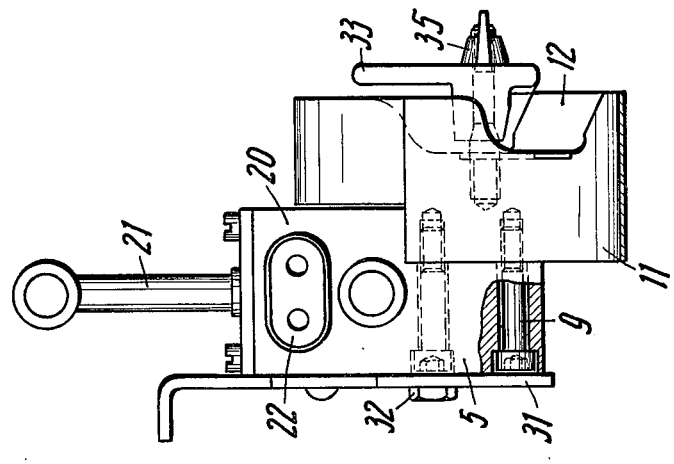
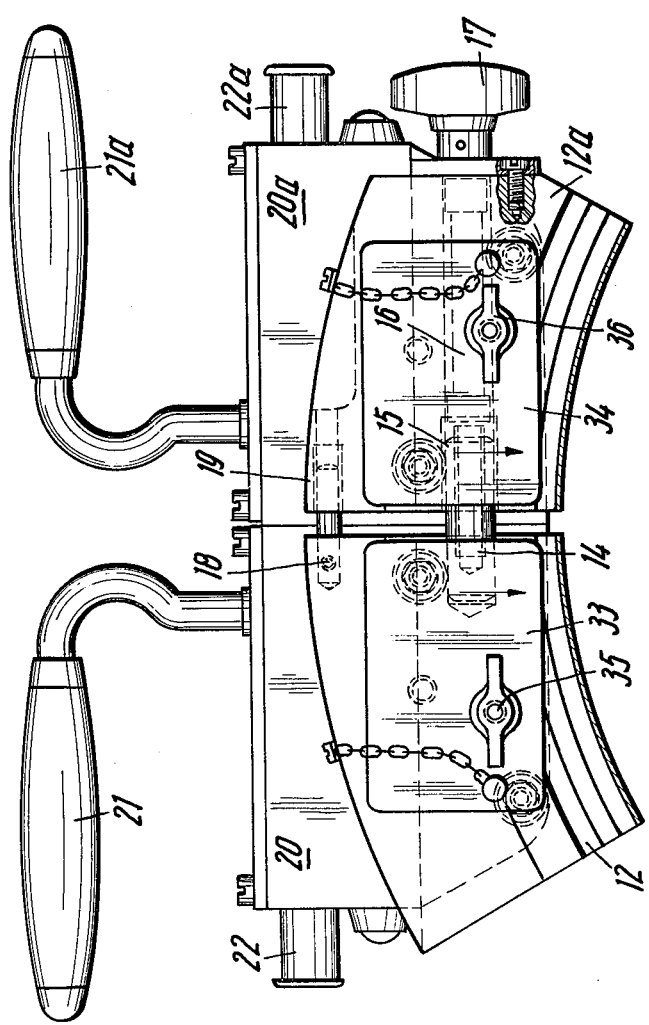

DEVICE FOR USE IN UNITING THE ADJACENT ENDS OF RADIALLY SPLIT SEALING RINGS

BACKGROUND OF THE INVENTION

1. Field of the Invention

This invention relates to a device for use in making a homogeneous union of the cut surfaces of a sealing ring of elastic material, which is cut open radially on one side, and relates more particularly to such sealing rings for use as stern tube seals in ships.

2. Description of Prior Art

A device of this kind can be used to replace, in particular, the used sealing rings of stern tube seals in ships without having to uncouple and dismantle the propeller shaft of the ship or to dry-dock the ship for this purpose. It is known that in stern tube seals, for example of the kind described in German Pat. Specification No. 858,371, sealing rings which have become useless can be changed only when the ship has been docked and the propeller shaft has then been uncoupled and dismantled.

This procedure is both complicated and time consuming as well as being costly.

It has been proposed to provide stern tube seals in ships with chambers in which spare sealing rings are fastened so that worn-out sealing rings can be replaced without dismantling the propeller shaft of the ship. This method, however, has not been successful in practice, since it is too expensive and entails difficulties in the construction of the seals.

For joining together the cut surfaces of a sealing ring of elastic material, which has been split radially on one side, for stern tube seals in ships, an apparatus is known which has a shaped body provided with a recess corresponding to the contours of the sealing ring and on which clamping means are provided to enable the cut surfaces of the sealing ring, which are provided with an adhesive, to be brought into line with one another. A device of this kind is provided with a heater for the purpose of heating the joint of a sealing ring of this kind, thereby shortening the time required for the hardening of the adhesive. An arrangement of this kind however, has the considerable disadvantage that in the first place one end of the sealing ring must first be secured in one of the clamping means, whereupon the end face of the unclamped end must be pressed by hand against the end face of the clamped end, the clamping means for the said second end not being tightened until this has been done. This arrangement has in addition the disadvantage that the pressure by which the two end faces of the sealing ring to be joined are pressed against one another cannot be accurately determined, since it cannot be controlled.

An object of the present invention is to provide a device for uniting the ends of split sealing rings, particularly sealing rings for ships stern tube seals, wherein the pressure by which the two end faces of the severed sealing ring can be pressed together, after the application of an adhesive, can be accurately controlled and the positions of the opposing end faces of the free ends of a split ring can be accurately predetermined.

Another object of the invention is to provide an apparatus of the aforesaid kind which takes up little space and can without difficulty be moved into and out of spaces between casing parts, particularly casing parts of a stern tube seal.

A further object of the invention is to provide an apparatus for uniting the cut surfaces of a radially split sealing ring of elastic material, particularly for stern tube seals in ships, using a shaped body having recesses corresponding to the contours of the sealing ring together with clamping means for fastening the ends of the sealing ring, the cut surfaces of which have been provided with an adhesive.

SUMMARY

According to the invention the body member receiving the ends of the severed sealing ring is in the form of a shaped body divided in the radial direction of the sealing ring, and its parts are constructed so as to be relatively movable towards and away from one another substantially in the tangential direction of the sealing ring.

In one embodiment of the invention there is provided for the body members at least one guide, but preferably a plurality of guides, by which an accurately aligned and linear movement of the body member towards and away from one another may be obtained.

One of these guides may simultaneously act as control means for the movement of the body members towards and away from one another. For this purpose one member is provided with a threaded bush which may extend into and be movable relative to the opposite body member, while in the latter a screw thread control means is provided cooperating with the threaded bush.

In another embodiment, means are provided for fastening the ends of a radially severed sealing ring, such means preferably having in each body member a recess, approximately corresponding to the profile of a sealing ring, to receive each end of the cut-through sealing ring, while a coacting profiled segment for the sealing ring is movably connected to a slide rail for fastening the coacting profile.

The invention relates to further practical constructions as explained below.

BRIEF DESCRIPTION OF THE DRAWINGS

Two embodiments of the invention are illustrated as examples in the accompanying drawings.

FIG. 1 is a side view of an apparatus for use in uniting the adjacent ends of radially split sealing rings;

FIG. 2 is an end view, viewed from the left in FIG. 1;

FIG. 3 shows a modified form of apparatus; and,

FIG. 4 is an end view, viewed from the left in FIG. 3.

DESCRIPTION OF PREFERRED EMBODIMENTS

FIG. 1 shows an apparatus for uniting the ends of a sealing ring which has been severed radially on one side. The apparatus comprises a body part 5 and an adjacent body part 6 disposed in the same plane. Each of the body parts 5 and 6 has a profiled body member designated 7 and 8. Each body part 7 and 8 is provided at its lower end 11 with a profile adapted approximately to the contours of a sealing ring. Opposite each of the parts 11 is disposed a coacting profiled segment 12 and 12a respectively which together with 11 form an aperture for the sealing ring. Each segment is joined by a chain 13 or 13a to the body members 7 and 8 respectively. The means of fastening the ends of a cut-through sealing ring inside the members 7 and 8 at 11, and segments 12, 12a are hereinafter described.

Inside body member 7 is fastened in a bore an internally threaded bush 14, the front end of which extends in a recess 15 in the body member 8 lying opposite it (FIG. 1). The body member 8 is adapted to move linearly relative to the projecting portion of bush 14. For this purpose a threaded spindle 16 is mounted inside the body member 8, this threaded spindle 16 being rotatable but incapable of longitudinal movement and being adapted to engage by its external thread the internal thread of the bush 14. The threaded spindle 16 projects outside of body member 8 and on its projecting end carries a rotatable knob 17.

In addition, a guide rod 18 is inserted and fastened in a bore in body member 7 and can extend into a recess 19 in body member 8. The threaded bush 14, in conjunction with the recess 15 in body member 8 and the rod 18 in conjunction with the recess 19 in member 8, form two guides by which the threaded spindle 16 can be moved into or out of the threaded bush 14 to achieve accurately guided relative movements of body members 7 and 8 towards and away from one another.

In the upper portion of each shaped body part is provided a heater 20, 20a which is fastened to a handle 21, 21a. These heaters 20, 20a contain conventional heating elements in conjunction with a thermostat and plug sockets 22, 22a for connecting a source of electric current, and are so constructed that they can be used for sealing rings of various profiles. Body parts 5, 6 may be secured by screws 9, 10 to body members 7 and 8.

In each of the shaped body parts 5 and 6 and in the segment 12 and 12a are provided slots 23, 24 and 23a, 24a respectively, in which slide bars 25, 25a are slidably mounted. These slide bars 25, 25a are each provided at their upper ends with a control knob 26, 26a. The slide bars 25, 25a are provided with guide slots 27, 28 and 27a, 28a respectively, through which pass screws 29, 30 and 29a, 30a respectively, which are screwed into body members 7 and 8, so that the slide bars 25, 25a are effectively guided. The bottom ends of the slide bars 25, 25a can be introduced into the slots 24, 24a in the coacting segment 12, so that segments 12, 12a are effectively fastened in their working position when they are required to hold fast in each case one end of a cut-through sealing ring. To achieve reliable clamping of the ends of a profiled ring, the slots 24, 24a and the bottom ends of the slide bars 25, 25a are slightly bevelled (FIG. 2).

For mounting an apparatus of the invention, a support 31 is provided on the rear side of each body part 5 or 6, the support 31 being adjustably fastened on each shaped body part 5, 6 by a screw 32.

In the construction shown in FIGS. 3 and 4, the same constructional parts are used as in the construction described with reference to FIGS. 1 and 2, and therefore the same references are used for the components as in FIG. 1.

The construction shown in FIGS. 3 and 4 differs however from the construction of FIGS. 1 and 2 in that instead of the guide bars 25, and 25a there are provided in each body member 7, 8 profiled pressure plates 33 and 34 which are clamped fast by wingnuts 35 and 36 and stud bolts, so as to receive the ends of a cut-through sealing ring.

For the purpose of replacing a worn sealing ring in a seal, with the aid of an apparatus of the invention, the procedure may be as follows:

A new sealing ring is inserted into body members 7 and 8 at 11, and segments 12 or 12a and with the aid of the slide bars 25, 25a is fastened by the segments 12, 12a or by attaching the pressure plates 33, 34, and the two body members 7 and 8 are moved slightly apart by turning the threaded spindle by the knob 17, whereby the threaded spindle 16 is screwed out of the threaded bush 14 so that the sealing ring is slightly clamped. The sealing ring is then cut through in the middle between the two body members 7 and 8, the threaded spindle 16 is then turned further with the aid of the knob 17 until separation is achieved between the threaded spindle 16 and the threaded bush 14, the two body members 7 and 8 then being completely separated from one another. The new sealing ring together with the two body members 7 and 8 is then placed around the shaft and the end faces of the sealing ring are coated with a suitable adhesive, which may be a two-component adhesive (plastics adhesive). The body members 7 and 8 are then screwed together again, the threaded spindle 16 being moved into the threaded bush 14, while at the same time the guide rods 18 of the body member 7 move into the recess 19 in the other body member 8. A plurality of such guides may naturally be provided. Owing to the fact that the guides are provided for the two body members 7 and 8, lateral displacement of the end pieces of the divided sealing ring is impossible, and consequently the end faces of the cut-through sealing ring lie flush against one another. The pressure applied to the adhesive or bonding agent can be accurately adjusted by correspondingly turning the threaded spindle 16. The automatic flush arrangement of the end faces of the sealing ring is of particular importance, since because of the limited space inside a seal it is not possible for the position of the ends of the sealing ring to be visually inspected. The desired accurate pressing together of the end faces of the sealing ring is thereby achieved at the same time.

We claim:

1. An apparatus for homogeneously uniting the ends of a sealing ring split radially on one side and provided with adhesive comprising two body members, each member defining a guide slot therein and a profile of a portion of the sealing ring to be united, two segments coacting with said members each of which defines a guide slot therein and the remaining portions of the profile of the sealing ring to be united, each body member and segment when assembled defining an aperture shaped to the contour of the sealing ring, means on each of said body members for effecting relative movement between said body members towards and away from each other in a direction tangential to said ring in said apertures to clamp said ring with its adhesive coated ends pressed together to effect a homogeneous joint between them, and two slide bars each of which is slidable within a said guide slot in a body member and cooperating segment when said member and segment are aligned for securing said segments to said members.

2. The apparatus according to claim 1, wherein said means comprise at least one protrusion on one body member and a recess in the other body member to receive said protrusion to ensure relative linear movement between said shaped body members.

3. The apparatus according to claim 2, wherein said means include a control element for controlling said relative movement of the body members.

4. The apparatus according to claim 3, wherein said recess is a threaded bush and said control element is a threaded spindle cooperating with said threaded bush to effect relative movement between said body members.

5. The apparatus according to claim 1, including means to slidably secure said slide bar to said member.

6. The apparatus according to claim 5, wherein each slide bar carries at one end a control knob for moving said slide bar.

7. The apparatus according to claim 1, wherein the guide slot of each segment is beveled so that each slide bar can apply a clamping action against said body member.

8. The apparatus according to claim 1, wherein both segments are identical and each is joined to a different body member.

9. The apparatus according to claim 8 including two body parts each of which is attached to a body member by a threaded screw which extends through each said body part and engages in a threaded recess in each body member.

10. The apparatus according to claim 9 including a support provided on the rear of each body part which extends in the direction of said body member.

11. The apparatus according to claim 1 including a heater integral with each of said body members and a handle provided on each body member adjacent to said heater.

* * * * *